(12) United States Patent
Matsunoshita

(10) Patent No.: US 8,023,127 B2
(45) Date of Patent: Sep. 20, 2011

(54) GENERATING BACKGROUND IMAGE INFORMATION FOR COPY PROHIBITION AND COPY PROHIBITION RELEASE

(75) Inventor: Junichi Matsunoshita, Kanagawa (JP)

(73) Assignee: Fuji Xerox Co., Inc., Tokyo (JP)

( * ) Notice: Subject to any disclaimer, the term of this patent is extended or adjusted under 35 U.S.C. 154(b) by 1032 days.

(21) Appl. No.: 11/798,426

(22) Filed: May 14, 2007

(65) Prior Publication Data

US 2008/0101651 A1     May 1, 2008

(30) Foreign Application Priority Data

Oct. 30, 2006   (JP) ................................ 2006-294960

(51) Int. Cl.
*G06K 15/00* (2006.01)
*G06K 9/00* (2006.01)

(52) U.S. Cl. ........ 358/1.14; 382/100; 399/366; 358/3.28
(58) Field of Classification Search .......... 382/100; 399/366; 358/3.28, 1.14
See application file for complete search history.

(56) References Cited

U.S. PATENT DOCUMENTS

| | | | |
|---|---|---|---|
| 5,481,378 A * | 1/1996 | Sugano et al. ................. | 358/501 |
| 6,572,025 B1 * | 6/2003 | Nishikado et al. ............ | 235/494 |
| 7,184,571 B2 * | 2/2007 | Wang et al. ................... | 382/100 |
| 7,227,661 B2 * | 6/2007 | Matsunoshita ................. | 358/1.15 |
| 7,428,067 B2 * | 9/2008 | Kiwada ........................ | 358/1.14 |
| 7,532,738 B2 * | 5/2009 | Hashimoto et al. ........... | 382/100 |
| 7,599,099 B2 * | 10/2009 | Tamaru ........................ | 358/3.28 |
| 7,715,779 B2 * | 5/2010 | Kondo et al. ................. | 399/367 |
| 7,729,018 B2 * | 6/2010 | Matsunoshita ................ | 358/474 |
| 2003/0179399 A1 * | 9/2003 | Matsunoshita ............... | 358/1.13 |
| 2003/0179412 A1 * | 9/2003 | Matsunoshita ............... | 358/3.28 |
| 2007/0076262 A1 * | 4/2007 | Umeda et al. ................. | 358/3.28 |
| 2007/0097411 A1 * | 5/2007 | Kondo et al. ................. | 358/1.14 |

FOREIGN PATENT DOCUMENTS

| | | |
|---|---|---|
| JP | A-2000-032253 | 1/2000 |
| JP | A-2002-036763 | 2/2002 |
| JP | A-2003-280469 | 10/2003 |
| JP | A-2006-270433 | 10/2006 |

OTHER PUBLICATIONS

U.S. Appl. No. 11/798,425, filed May 14, 2007, in the name of Junichi Matsunoshita.
Japanese Office Action issued Jun. 1, 2011 for Japanese Patent Application No. 2006-294960 (with translation).

* cited by examiner

*Primary Examiner* — Jason M Repko
*Assistant Examiner* — Patrick Edwards
(74) *Attorney, Agent, or Firm* — Oliff & Berridge, PLC

(57) ABSTRACT

An image processing apparatus includes a background image generation section and a combining section. The background image generation section generates a background image, which represents (i) background information containing copy prohibition information indicating copy is prohibited and (ii) copy prohibition release information indicating a condition to release copy prohibition, by predetermined patterns. The combining section combines a target image to be formed and the background image generated by the background image generation section to generate a composite image and that outputs the composite image to a formation section that forms an image on a recording medium. When generating the background image, the background image generation section arranges the pattern of the copy prohibition release information in an end region of the recording medium.

7 Claims, 10 Drawing Sheets

US 8,023,127 B2

GENERATING BACKGROUND IMAGE INFORMATION FOR COPY PROHIBITION AND COPY PROHIBITION RELEASE

CROSS-REFERENCE TO RELATED APPLICATIONS

This application is based on and claims priority under 35 U.S.C. §119 from Japanese Patent Application No. 2006-294960 filed Oct. 30, 2006.

BACKGROUND

1. Technical Field

The invention relates to an image processing apparatus, an image forming apparatus, an image processing program, a computer readable medium storing the image processing program and a computer data signal.

2. Related Art

Recently, it has been made possible to easily reproduce a document, etc., with the widespread use of an image forming apparatus having a copying function, such as a personal computer, a printer, and a copier. On the other hand, information leakage as unauthorized copy of a secret document now becomes an issue.

SUMMARY

According to an aspect of the invention, an image processing apparatus includes a background image generation section and a combining section. The background image generation section generates a background image, which represents (i) background information containing copy prohibition information indicating copy is prohibited and (ii) copy prohibition release information indicating a condition to release copy prohibition, by predetermined patterns. The combining section combines a target image to be formed and the background image generated by the background image generation section to generate a composite image and outputs the composite image to a formation section that forms an image on a recording medium. When generating the background image, the background image generation section arranges the pattern of the copy prohibition release information in an end region of the recording medium.

BRIEF DESCRIPTION OF THE DRAWINGS

Exemplary embodiments of the invention will be described below in detail with reference to the accompanying drawings, wherein.

DETAILED DESCRIPTION

Figure 1:
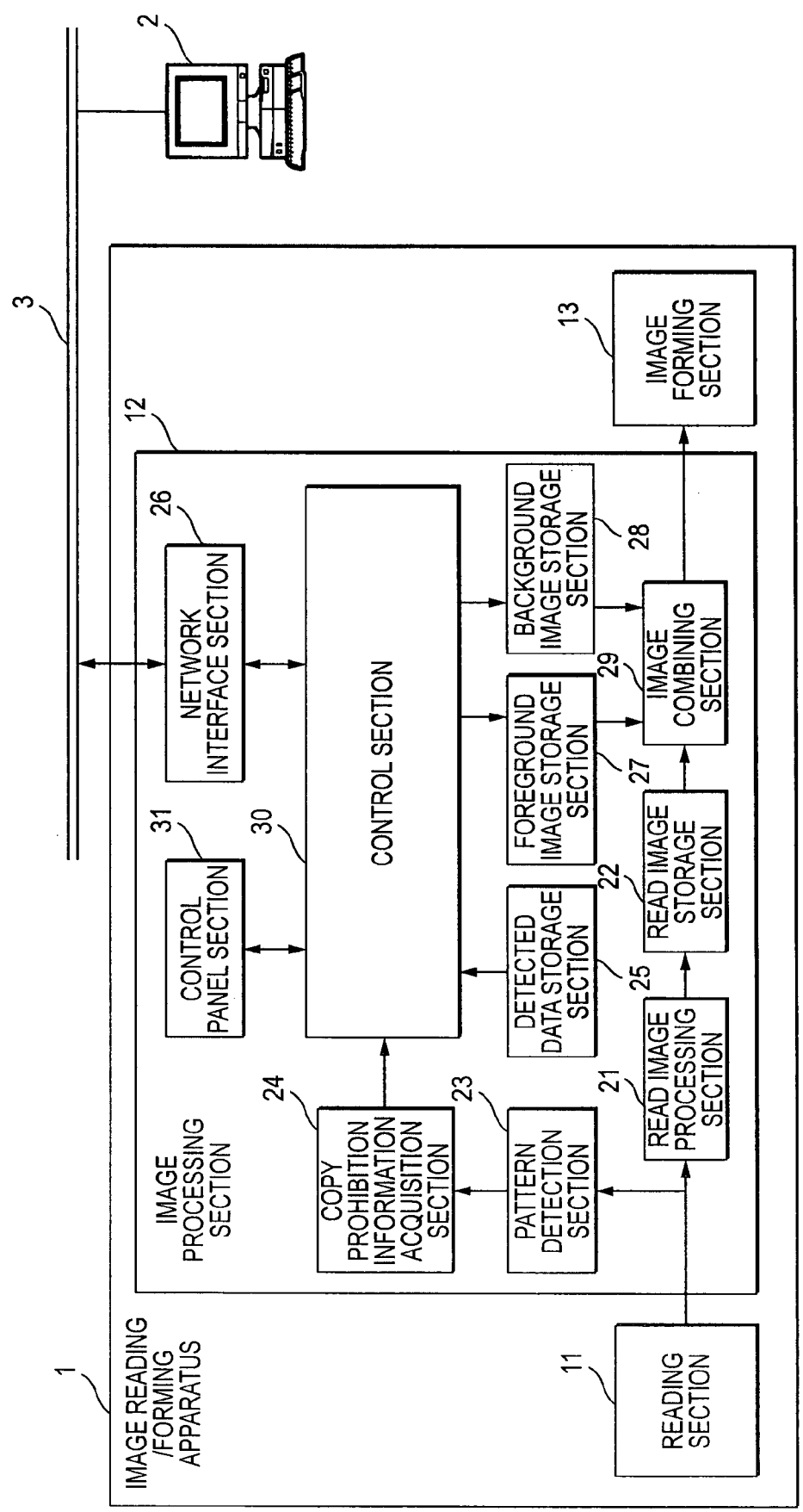
FIG. 1 is a block diagram to show an exemplary embodiment of the invention.

FIG. 1 is a block diagram to show one exemplary embodiment of the invention. In FIG. 1, numeral 1 denotes an image reading/forming apparatus, numeral 2 denotes a client, numeral 3 denotes a network, numeral 11 denotes a reading section, numeral 12 denotes an image processing section, numeral 13 denotes an image forming section, numeral 21 denotes a read image processing section, numeral 22 denotes a read image storage section, numeral 23 denotes a pattern detection section, numeral 24 denotes a copy prohibition information acquisition section, numeral 25 denotes a detected data storage section, numeral 26 denotes a network interface section, numeral 27 denotes a foreground image storage section, numeral 28 denotes a background image storage section, numeral 29 denotes an image combining section, numeral 30 denotes a control section, and numeral 31 denotes a control panel section.

The image reading/forming apparatus 1 shown in FIG. 1 has a copying function independently. The image reading/forming apparatus 1 is connected to the network 3 and has at least a function of forming an image based on image data received through the network 3. In the description of the example shown in FIG. 1, it is assumed that the image data is sent from the client 2. Of course, the image reading/forming apparatus 1 may have any other function such as a scanner function of reading an image on an original and transferring the read image through the network 3, needless to say.

The image reading/forming apparatus 1 includes the reading section 11, the image processing section 12 and the image forming section 13. The reading section 11 reads an image on an original and sends the read image to the image processing section 12. The image forming section 13 forms the image sent from the image processing section 12 on a recording medium such as a sheet of paper, for example.

The image processing section 12 performs a process for the image read by the reading section 11, a drawing process based on the image data received through the network 3, etc., and outputs the post-processed image to the image forming section 13. Particularly, to prevent copying of the image formed by the image forming section 13, the image processing section 12 has a function of performing a process of superposing copy prohibition information, trace information and copy prohibition release information on the image read by the reading section 11 or the image data received through the network 3 and then output the resultant image data. When the reading section 11 reads the image on the original formed by superposing such copy prohibition information, trace information and copy prohibition release information, the image processing section 12 has a function of acquiring the copy prohibition information, the trace information and the copy prohibition release information from the read image, determining as to whether or not copying is permitted, and controlling whether or not the image is to be output to the image forming section 13.

In the example shown in FIG. 1, the image processing section 12 includes the read image processing section 21, the read image storage section 22, the pattern detection section 23, the copy prohibition information acquisition section 24, the detected data storage section 25, the network interface section 26, the foreground image storage section 27, the background image storage section 28, the image combining section 29, the control section 30 and the control panel section 31.

The read image processing section 21 performs various types of image processing for the image read through the reading section 11 so that the image becomes an optimum image to be formed by the image forming section 13. The read image storage section 22 temporarily stores the image processed by the read image processing section 21 when the image is output to the image forming section 13. When the image forming section 13 forms an image whose copying is prohibited, the image stored in the read image storage section 22 becomes a foreground image (a non-limited example of a target image to be formed).

From the image read through the reading section 11, the pattern detection section 23 detects a predetermined pattern embedded in the image and restores it to the original information (namely, "1" or "0"). A specific pattern of the predetermined pattern will be described later.

If the copy prohibition information indicating that copying is prohibited exists in the information of the predetermined pattern detected by the pattern detection section 23 in regions other than an end region of the image read by the reading section 11, the copy prohibition information acquisition section 24 acquires the copy prohibition information and sends the acquired copy prohibition information to the control section 30.

The detected data storage section 25 stores the data of the predetermined pattern detected by the pattern detection section 23. The data is used for the control section 30 to acquire the copy prohibition release information or further acquires the trace information.

The network interface section 26 communicates with a client 2, for example, through the network 3. Here, the network interface section 26 receives image data sent through the network 3. The image data may be data in an analyzable format such as data described in a printer description language (PDL), for example.

The foreground image storage section 27 stores foreground image data provided by the control section 30 based on the image data received by the network interface section 26. The foreground image data may also be used when the control section 30 performs the drawing process.

The background image storage section 28 stores a background image that represents background information such as the copy prohibition release information, the copy prohibition information and the trace information, by a predetermined pattern. The background image is generated by the control section 30 as described later.

When the image forming section forms an image which is prohibited from being copied, the image combining section 29 combines the image stored in the read image storage section 22 (one non-limited example of the target image to be formed) or the image stored in the foreground image storage section 27 (another non-limited example of the target image to be formed) and the background image stored in the background image storage section 28 to generate a composite image, and outputs the generated composite image to the image forming section 13. When usual copying is instructed or a normal image is formed, the background image is not combined.

The control section 30 performs not only internal control of the image processing section 12, but also control of the whole multifunction processing machine including the reading section 11 and the image forming section 13. Particularly, the control section 30 contains a control function to form an image, which is prohibited from being copied, and a control function that is executed when a copying-prohibited original is read. As a control function to form an image prohibited from being copied, the control section 30 may function as a background image generation section that generates the background image, which represents, by the predetermined pattern, (i) the background information containing the copy prohibition information and the trace information and (ii) the copy prohibition release information indicating a copy prohibition release condition and stores the background image in the background image storage section 28. When the background image is generated, the patterns are arranged so that the pattern of the copy prohibition release information is arranged in an end region and the pattern of the background information is arranged in regions other than the end region when the image forming section 13 forms the image. The copy prohibition information indicates as to whether or not copying is prohibited. The trace information is used to determine an output source of the formed image later. For example, the trace information may be a user ID for identifying a who inputs an image formation instruction, a document name, a document ID, identification information of an apparatus for forming the image or image formation date and time. If the image is formed based on the image data received through the network 3, the trace information may be information of the client 2, which has transmitted the image data. Further, the copy prohibition release information is used to permit copying if a certain condition is satisfied even though the copy prohibition information indicates that copying is prohibited. For example, the copy prohibition release information may be a personal identification number, a user ID of a user who is permitted to make a copy, date and time when the copy prohibition is released or machine number of an apparatus, which is permitted to make a copy. Of course, any desired information may be contained as the trace information and the copy prohibition release information.

As a control function executed when a copy-prohibited original is read, the control section 30 may function as first acquisition section that acquires the copy prohibition release information, function as a first determination section that determines as to whether or not the copy prohibition information acquisition section 24 has detected copy prohibition information and determines as to whether or not copy prohibition release information has been acquired, and function as a second determination section that determines as to whether or not the copy prohibition release condition indicated by the copy prohibition release information is satisfied when the copy prohibition information acquisition section 24 has acquired the copy prohibition information and the copy prohibition release information has acquired.

The control section 30 may read, from the detected data storage section 25, data of a predetermined pattern detected by the pattern detection section 23 at least in a leading-end region (which is an end region at an upper end) of the image read through the reading section 11 and extract the copy prohibition release information therefrom. The control section 30 may acquire the copy prohibition release information from the information of the predetermined pattern, which is detected by the pattern detection section 23 not only in the leading-end region of the image but also in the other three end regions, and determine the copy prohibition release information based on a match degree among the acquired copy prohibition release information. For example, if different data is detected from one end region, the control section 30 may determine the copy prohibition release information based on majority rule. The control section 30 may determine the copy prohibition release information based on other pieces of information. Also, the control section 30 may acquire the copy prohibition release information from end regions in other sides of the image if the copy prohibition release information extracted from one end of the image is insufficient.

If the copy prohibition release condition is not satisfied as a result of judging the condition, the image is not output to the image forming section 13 under the control of the control section 30. If the copy prohibition release condition is satisfied, the image stored in the read image storage section 22 is output from the image combining section 29 to the image forming section 13 so as to form the image, that is, make a copy under the control of the control section 30.

The trace information is contained in regions of the image other than the end regions of the image read by the reading section 11 as well as the copy prohibition information. The control section 30 may read and extract data regarding such information from the detected data storage section 25.

The control panel section 31 includes a display device, and an input device, for serving as a user interface. For example, the control panel section 31 enables a user to input a copying execution command and to input a user ID and a personal identification number as a condition of releasing copy prohibition. The control panel section 31 may also include an IC card reader so that user authentication is conducted by reading an IC card.

Figure 2:
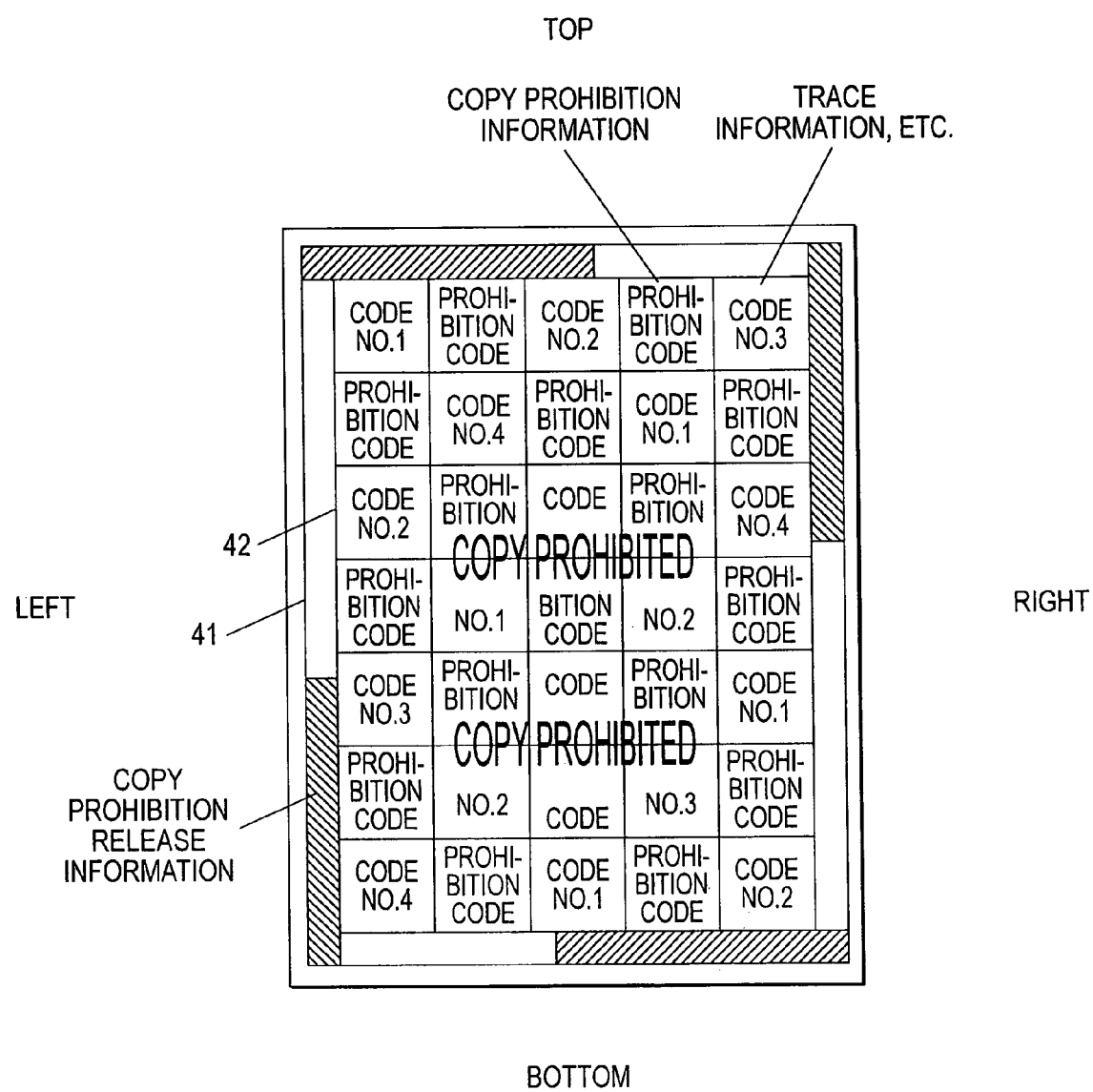
FIG. 2 is a schematic representation of a specific arrangement example of background information and copy prohibition release information.

FIG. 2 is a schematic representation of a specific arrangement example of the background information and the copy prohibition release information. In FIG. 2, numeral 41 denotes an end region, numeral 42 denotes an internal region, and numeral 43 denotes a latent image. To prohibit copying of an image formed by the image forming section 13, the control section 30 generates a background image and the image combining section 29 combines the background image and a foreground image to generate a composite image as described above. To generate the background image, the background information and the copy prohibition release information are arranged as shown in FIG. 2. That is, the control section 30 converts the copy prohibition release information into a code pattern with using a predetermined pattern and arranges the code pattern in an elongated region (end region 41) in an end portion of a recording medium on which the image forming section 13 forms an image. The end region 41 is a region between the internal region 42 and an edge of the recording medium. The size of the end region 41 is arbitrary.

The pattern of the copy prohibition release information is arranged in the end region 41. Also, dummy data that is converted into a code pattern with using the predetermined pattern is arranged in the remaining portions of the end region 41. In FIG. 2, the portion where the copy prohibition release information is converted into a code pattern and is arranged is hatched. The code pattern of the dummy data is arranged in each unhatched portion of the end region 41. As the dummy data, for example, random data may be used rather than various types of information used in the exemplary embodiment such as the copy prohibition information, the copy prohibition release information and the trace information. The code pattern of the dummy data renders the pattern portion of the copy prohibition release information hard to recognize visually.

The end regions 41 exist along the top, bottom, left, and right sides of a recording medium. The pattern of the copy prohibition release information is arranged in the top, bottom, left, and right four end regions 41, whereby the copy prohibition release information can always be acquired from the pattern existing in the image leading-end region regardless of the orientation in which the original is placed or regardless of the direction in which reading the original is started in copying. The end region 41 often becomes a blank space in the foreground image and the copy prohibition release information can be reliably acquired.

Alternatively, the control section 30 may compare the copy prohibition release information acquired from one end region 41 with that acquired from another end region 41. Thereby, if the copy prohibition release information in any end region is falsified, such illegal action can also be detected. Of course, if the copy prohibition release information in any end region 41 cannot be acquired, the control section 30 may acquire the copy prohibition release information using any other end region 41.

Of course, if it is difficult to arrange all copy prohibition release information in a single end region 41, for example, because a data amount of the copy prohibition release information is large, the copy prohibition release information may be arranged using two or more end regions 41. Information associated with the copy prohibition information and any other information can also be contained in the copy prohibition release information.

The background information such as the copy prohibition information and the trace information is converted into a code pattern with using a predetermined pattern and is arranged in the internal region 42 except the end regions 41. In the example shown in FIG. 2, the internal region 42 is divided into blocks having a predetermined size and copy prohibition information pattern blocks and trace information pattern blocks are arranged alternately. In FIG. 2, "prohibition code" is written in each of the copy prohibition information pattern blocks and "code" is written in each of the trace information pattern blocks. The trace information may have a large data amount. In this example, four blocks from No. 1 to No. 4 are used as the trace information. The copy prohibition information pattern blocks and the trace information pattern blocks are arranged alternately. Thereby, if one pattern cannot be detected due to the foreground image, another pattern can be detected.

The patterns of the copy prohibition information and the trace information, which are arranged in the internal region 42, are combined with the foreground image and are repeatedly arranged. Thus, it is difficult to falsify the copy prohibition information and the trace information. An apparatus having a copy prohibition function would be able to reliably prohibit copying. If the image is copied by an apparatus having no copy prohibition function, the trace information pattern is also copied, so that the source can be traced.

It is considered that an error will occur such that the end region 41 is placed out of the reading region when copying is made or that the end region 41 is cut out or erased as an unnecessary portion because of the end portion of the recording medium. However, if the copy prohibition release information cannot be acquired from the end region 41, copy prohibition is not released and confidentiality is ensured. Thus, no problem arises. The pattern of the information which is desired to be protected against falsifying, illegal action, etc., is arranged in the internal region 42. Information whose confidentiality can be ensured even if falsifying, illegal action, etc., is done therefor is arranged in the end region 41.

In the example shown in FIG. 2, the latent image 43 is contained in the background image. Hitherto, paper printed with an image which will appear in copying but is unrecognizable to the human's eyes as the image (latent image) has been used as a document whose copy is prohibited. Recently, to form an image on normal paper, a latent image has been formed together without using special paper. In the example shown in FIG. 2, a text image of "copy prohibited" is contained in the background image as a latent image. The latent image is not recognized by the apparatus when copying is made and appears in the copy image so that the user can visually recognize it, thereby deterring copy. Of course, no latent image may be contained in the background image or any other means for preventing copy may be adopted, needless to say.

Figure 3A:
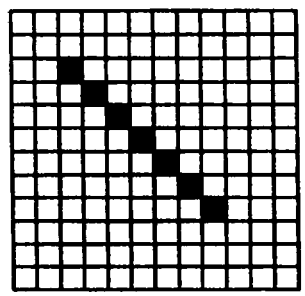
FIG. 3 is a schematic representation of examples of patterns.
Figure 3B:
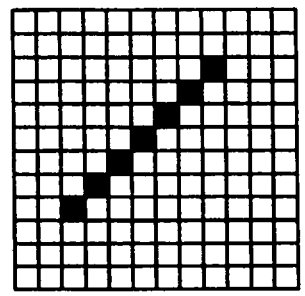

FIG. 3 is a schematic representation of examples of patterns. The pattern used in the exemplary embodiment represents "0" or "1" of information data as an image. The patterns shown in FIG. 3 are patterns also used in JP 2003-280469 A (corresponding to US 2003/0179399 A). If information data is "0," the pattern shown in FIG. 3A is used. If information data is "1," the pattern shown in FIG. 3B is used. Thereby, the information data can be replaced with the patterns. The patterns shown in FIGS. 3A and 3B render the fact that information is embedded therein unrecognizable if either the pattern is arranged. In this specification, a process of replacing information "0" or "1" with a pattern may be called "converting into a (code) pattern."

Figure 3C:
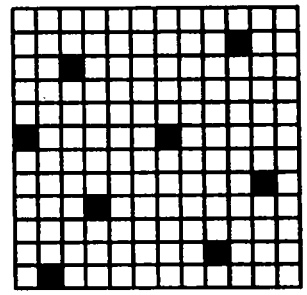

If the pattern shown in FIG. 3A and/or 3B is arranged in the latent image portion shown in FIG. 2, there is a possibility that the latent image portion will not function as a latent image. Thus, a pattern formed of dispersed dots as shown in FIG. 3C may be used in the latent image portion. Such a pattern may be used to generate a latent image, which will appear when copying is made, although the human eye cannot recognize such a pattern.

FIG. 4 is a schematic representation of examples of a part of a background image where plural patterns are arranged. M×N patterns shown in FIG. 3 are arranged in each of blocks where the background information pattern shown in FIG. 2 is arranged. The array of the M×N patterns forms a two-dimensional code to represent information. FIGS. 4A to 4C show examples of arranging patterns where M=N=10. The block size is not limited to the example, and any size such as M=N=20 patterns may be set. When a recording medium formed with an image is placed on the reading section 11 and is read, M=N is preferable because of the set orientation.

Figure 4A:
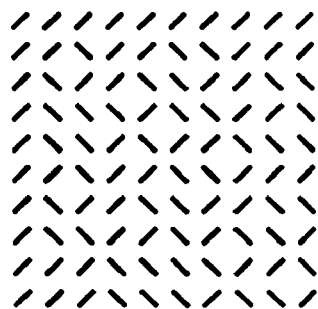
FIG. 4 is a schematic representation of examples of a part of a background image where plural patterns are arranged.

The example of the block shown in FIG. 4A is an example of arrangement of a trace information pattern. The patterns corresponding to respective values ("1" or "0") of data of the trace information are arranged in a block. The left one column and the top one row are used as a synchronous pattern. The trace information is indicated by patterns except the synchronous pattern.

Figure 4B:
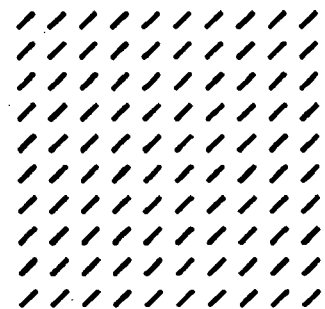
Figure 4C:
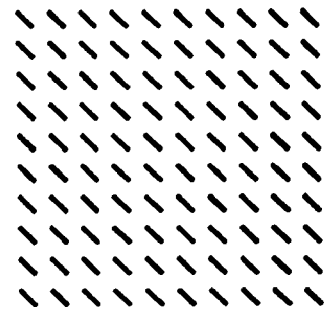

The examples of the blocks shown in FIGS. 4B and 4C show blocks in which a copy prohibition information pattern is arranged. Either of the blocks shown in FIGS. 4B and 4C may be adopted as the copy prohibition information pattern block. Alternatively, both the blocks may be mixed for use when another pattern arrangement block is used to indicate not copy-prohibited. In each of the block examples shown in FIGS. 4B and 4C, a special code having a feature different from the trace information pattern arrangement block shown in FIG. 4A is provided. This feature enables the copy prohibition information pattern block to be distinguished from the trace information pattern block.

Figure 4D:

The pattern array shown in FIG. 4D indicates an example of a pattern array of the copy prohibition release information pattern arranged in the end region 41. In this example, a width (the vertical direction in FIG. 4D) of the pattern array is shown as wide as four patterns. A length (the horizontal direction in FIG. 4D) of the pattern array depends on a length of a side of a recording medium. Also in this example, the left one column and the top one row are used as a synchronous pattern, and the pattern array other than the synchronous pattern provides the copy prohibition release information pattern.

If the patterns shown in FIG. 3 are used as the background information pattern arranged in the internal region 42 and as the copy prohibition release information pattern arranged in the end region 41 as shown in FIG. 4, a boundary therebetween does not appear and it is difficult for a user to distinguish from one region to the other region.

Of course, the patterns in FIG. 3 are shown by way of example, and other various patterns may be used. The pattern arrangement is not limited to the examples shown in FIG. 4.

Next, an example of the operation in the exemplary embodiment of the invention will be described. In the following description, as a specific example, the patterns shown in FIG. 3 are arranged as shown in FIG. 4 and further the information patterns are arranged in the end region 41 and the internal region 42 as shown in FIG. 2.

Figure 5:
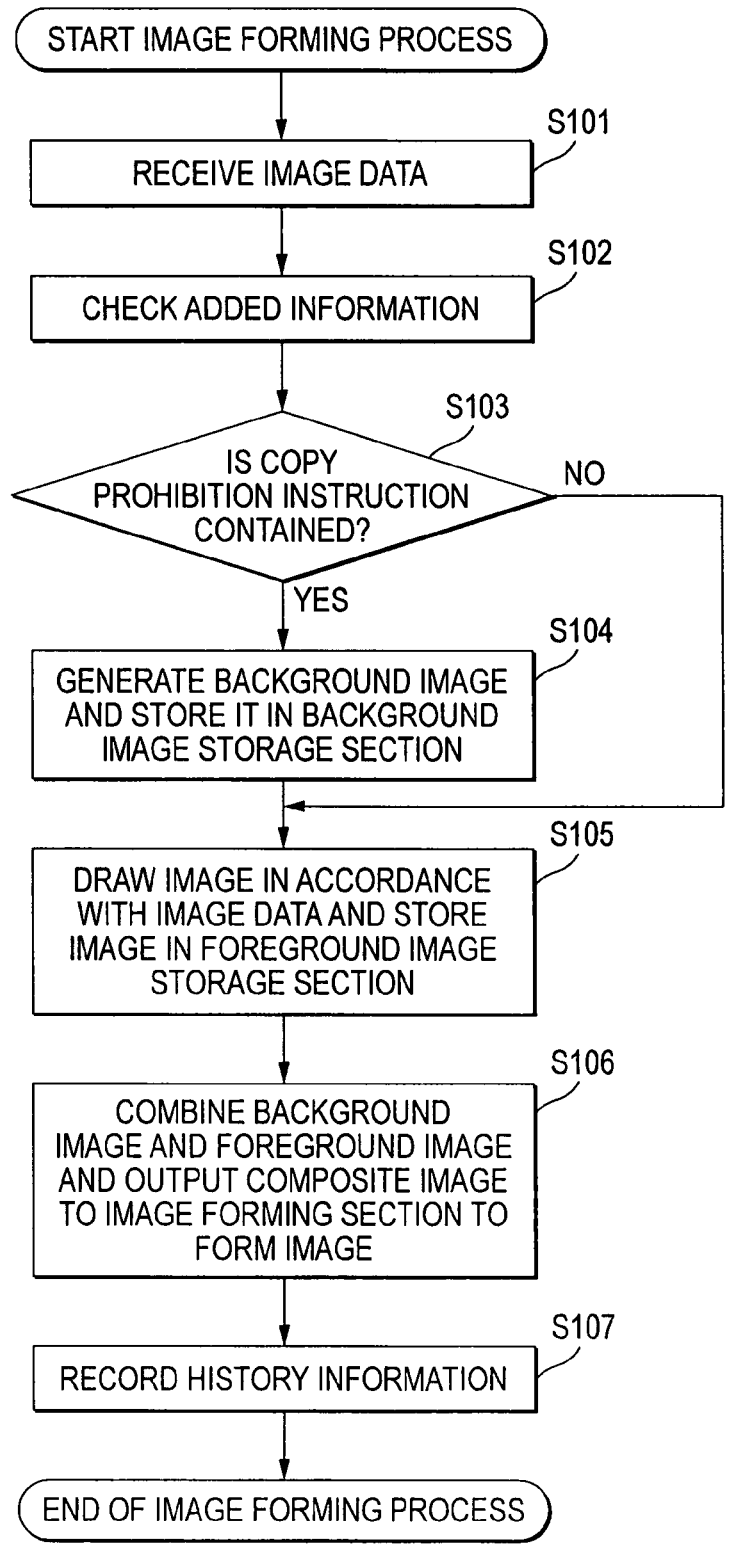
FIG. 5 is a flowchart to show an example of the operation for forming an image that is prohibited from being copied and is received through a network 3.

FIG. 5 is a flowchart to show an example of the operation for forming an image prohibited from being copied and received through the network 3. At S101, the network interface section 26 receives image data sent from the client 2, for example, through the network 3 and sends the received image data to the control section 30. The received image data is stored in an internal memory (not shown) of the control section 30.

Information giving various instructions to form the image data on a recording medium is added to the received image data. The control section 30 checks the information added to the received image data at S102 and determines as to whether or not the information contains a copy prohibition instruction at S103. If the information does not contain a copy prohibition instruction, the control section 30 skips S104 and goes to S105 to form a normal image.

If the control section 30 determines at S103 that a copy prohibition instruction is contained, the control section 30 generates a background image and stores the background image in the background image storage section 28. The background image is as previously described with reference to FIGS. 2 to 4 and an example of a process of generating the background image will be described later. The trace information may contain information that had already been added when the image data is received at S101, information concerning the client 2 which transmits the image data, information concerning a user of the client 2, an apparatus ID of this image reading/forming apparatus, data and time at which the image data is received and data and time at which an image is formed, among various pieces of information if necessary. The background image to be generated has a resolution corresponding to the resolution of the image forming section 13 and is generated as binary data. The control section 30 controls the image combining section 29 so as to combine the foreground image stored in the foreground image storage section 27 and the background image stored in the background image storage section 28 to generate a composite image. At this time, a color that is used when the binary background image is combined is set. For example, if the background image is combined with black, an image having a grayish background as a whole is formed. If the background image is combined with yellow, an image having a slightly yellowish background is formed. In this case, patterns become hard to recognize. To use any other color, the background is colored with the used color.

At S105, the control section 30 performs a drawing process in accordance with the image data received at S101, generates a foreground image, and stores the foreground image in the foreground image storage section 27. The drawing process may be preformed according to a known method.

At S106, the control section 30 gives an image formation instruction to the image forming section 13, which then forms an image. At this time, if an instruction of combining the foreground image and the background image is contained at S103, the image combining section 29 reads the foreground image stored in the foreground image storage section 27 and the background image stored in the background image storage section 28, combines the background image with the foreground image with the setup color to generate a composite image, and outputs the resultant composite image to the image forming section 13 in synchronization with the operation of the image forming section 13. Accordingly, the image forming section 13 forms an image in which the foreground image and the background image are combined. If the combining instruction is not given from the control section 30, the foreground image is read from the foreground image storage section 27 and is output to the image forming section 13. Accordingly, normal image formation is executed.

Upon completion of the image formation, at S107, an image formation history (log) is recorded. As the history information, information such as user identification information of a user who gives the image formation instruction which is extracted from the added information received together with the image data at S101, identification information of the client 2 which transmits the image data, identification information of the apparatus which executes the image formation, image formation date and time information, ID information of the history information, the number of image formation pages, the number of copies, information indicating color or monochrome and the image data main body may be recorded. Of course, any other information may be contained or some of the information may be recorded. The history information may be recorded in the internal storage unit (not shown) of the image reading/forming apparatus or may be transmitted through the network 3 to an external log management server to storage it.

In the description of the operation example given above, when the image forming section 13 forms an image based on the image data received through the network 3, the background image to prohibit copy is combined with the foreground image to form the composite image. In addition, for example, the background image to prohibit copy can also be combined with the image read through the reading section 11 to form a composite image if no pattern is embedded in the image to be read.

For example, if a user sets copy prohibition and enters a copy start instruction through the control panel section 31, the image read by the reading section 11 is processed by the read image processing section 21 and then is stored in the read image storage section 22. The fact that the pattern detection section 23 does not detect a predetermined pattern may be confirmed.

As at S106 in FIG. 5, the control section 30 generates the background image and stores the background image in the background image storage section 28. The copy prohibition information, the trace information and the copy prohibition release information which are required for generating the background image and a latent image as required may be set by the user through the control panel section 31 or may be preset by the administrator. To preset the information, variable information such as the user ID and the image formation date and time is acquired each time and is converted into a pattern.

When the image forming section 13 starts the image formation operation, the image combining section 29 reads the image stored in the read image storage section 22 (foreground image) and the background image stored in the background image storage section 28, combines the background image with the foreground image with the setup color to generate the composite image, and outputs the resultant composite image to the image forming section 13 in synchronization with the operation of the image forming section 13. Accordingly, the image forming section 13 forms an image in which the image read by the reading section 11 and the background image are combined. If a copy prohibition instruction is not given, the copy operation containing a copy prohibition process (described later) is performed as a general copy instruction.

Figure 6:
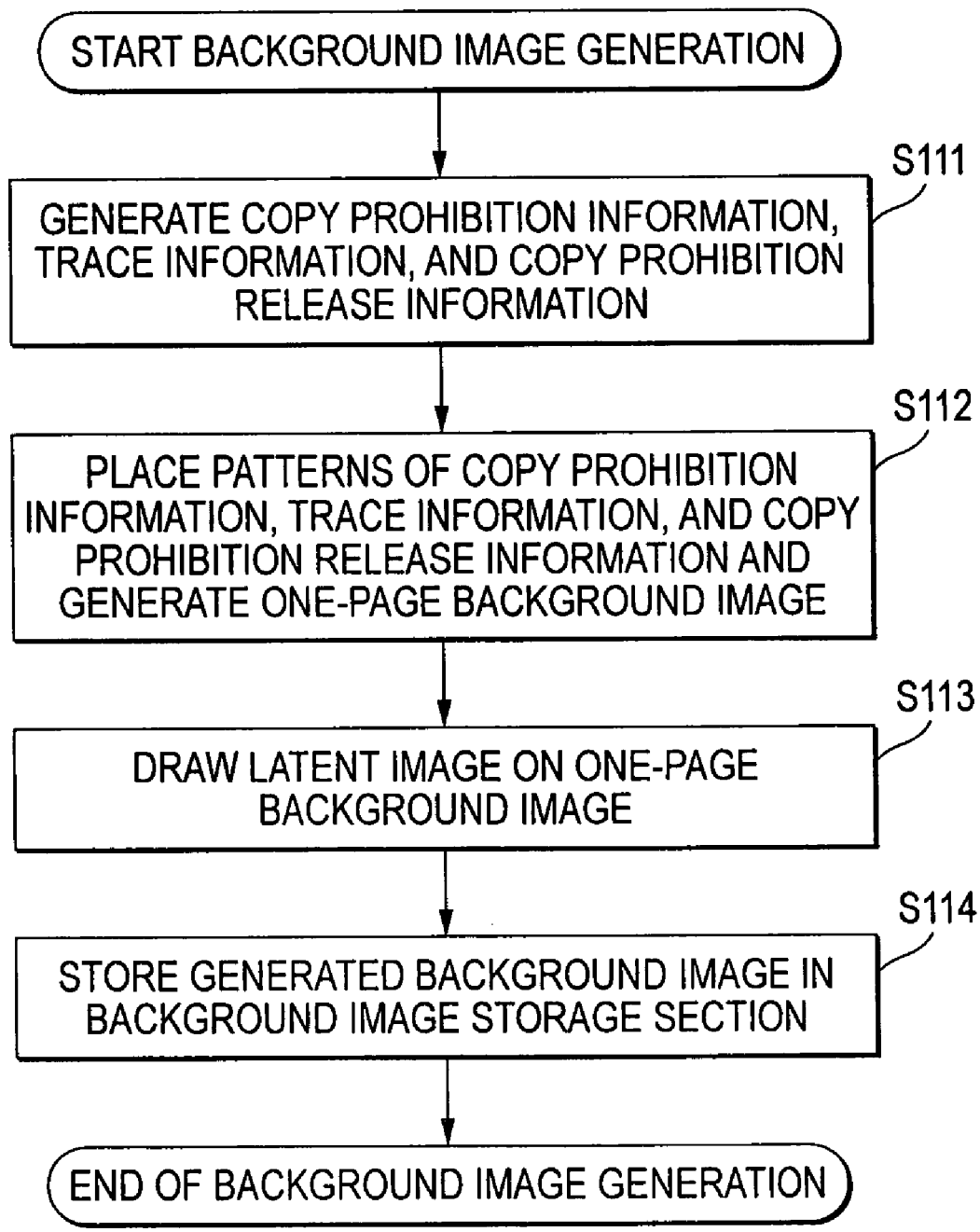
FIG. 6 is a flowchart to show an example of a process of generating a background image.

FIG. 6 is a flowchart to show an example of a process of generating the background image. As an example of the process of generating the background image by the control section 30 at S104 in FIG. 5, first at S111, the copy prohibition information, the trace information and the copy prohibition release information are generated from the added information received together with the image data at S101 in FIG. 5, the current date and time, apparatus information of the image reading/forming apparatus and job identification information of the image formation.

At S112, the control section 30 converts the copy prohibition release information into a pattern and arranges the pattern in the end region 41 as previously described with reference to FIG. 2. Also, the control section 30 converts the copy prohibition information and the trace information into patterns and repeatedly arranges the patterns in the internal region 42 in block units as previously described with reference to FIG. 2. Accordingly, one-page background information is generated. As the patterns used here, for example, the patterns shown in FIGS. 3A and 3B may be used. Using such patterns, uniform pattern blocks shown in FIGS. 4B and 4C are created as the copy prohibition information. For the trace information, blocks shown in FIG. 4A where patterns are arranged in accordance with data are created. If the data amount is large, the trace information may be divided and arranged in two or more blocks. The copy prohibition information pattern block and the trace information pattern block are repeatedly arranged in the internal region 42 as shown in FIG. 2. The copy prohibition release information is converted into a code pattern using the patterns shown in FIGS. 3A and 3B, and is arranged in accordance with the shape and size of the end region 41 shown in FIG. 4D. Also, dummy data is arranged in the remaining portion with using patterns shown in FIGS. 3A and 3B.

To form a latent image, at S113, a latent image is drawn on the background image generated at S112. The latent image may be a preset character string or pattern or a part of the trace information (user ID and date and time information). At this time, the pattern overlapping the latent image is replaced with a pattern with dispersed dots as shown in FIG. 3C. Accordingly, the latent image can be contained in the background image.

The background image thus generated is stored in the background image storage section 28 at S114. Thereafter, at S106 in FIG. 5, the image combining section 29 reads the background image from the background image storage section 28 and combines the background image with the foreground image. Then, the image forming section 13 forms a composite image.

Figure 7:
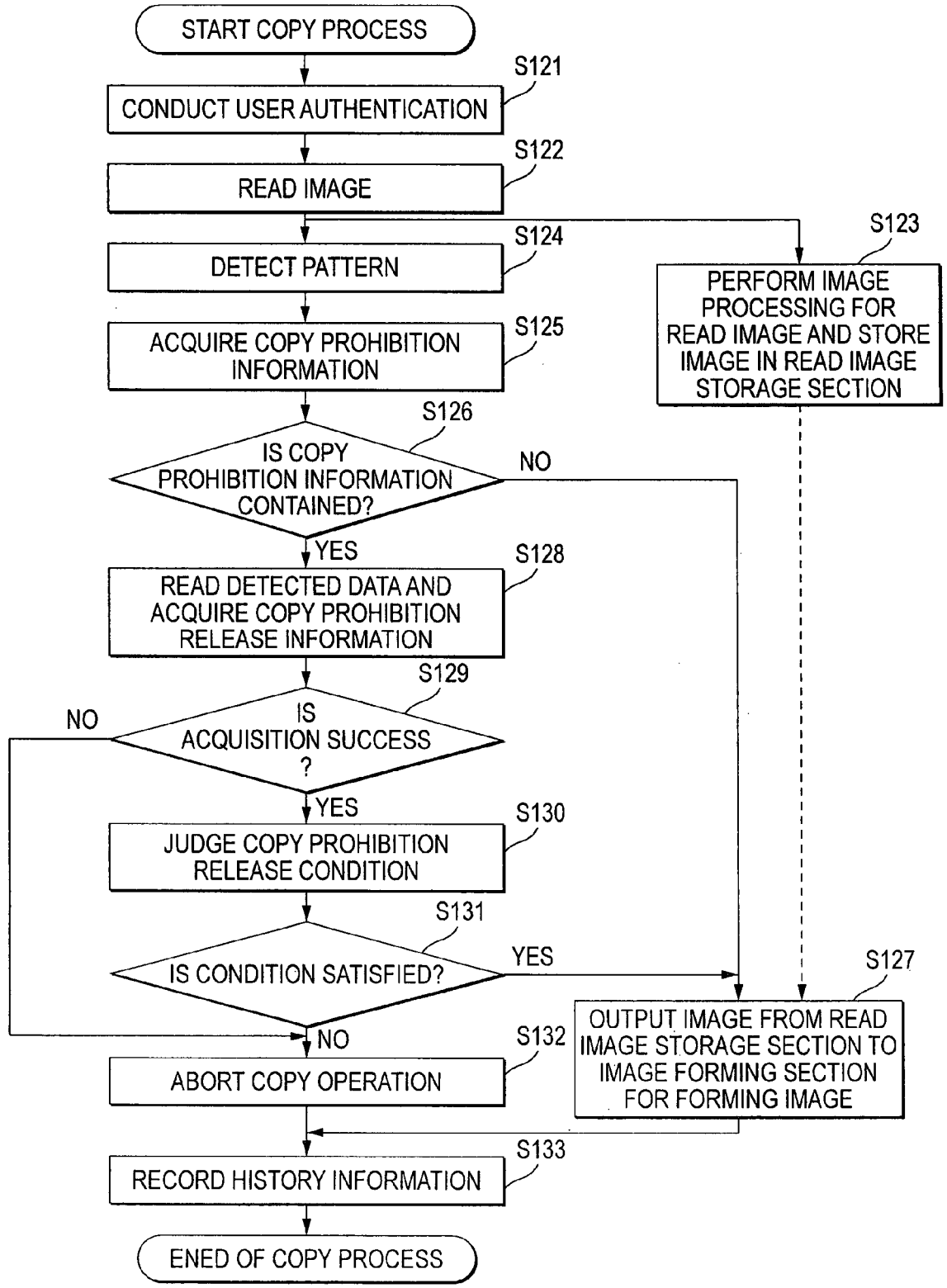
FIG. 7 is a flowchart to show an operation example during copying.

FIG. 7 is a flowchart to show an operation example when copy is made. In this example, first at S121, the user who attempts to copy is authenticated. As an authenticating method, the user may be authenticated with an IC card, may be requested to input a user ID and a password through the control panel section 31 for authentication or may be authenticated using biometric identity verification such as fingerprint verification. The user may be authenticated in the beginning or by the time when the copy prohibition release condition is judged. For example, the user may be authenticated whenever necessary when copy prohibition is released.

At S122, when the user inputs a copy start instruction through the control panel section 31, the control section 30 sends a reading start instruction to the reading section 11, which then reads an image on an original. The read image is sent to the read image processing section 21. At S123, the image is subjected to image processing optimum to forming of a copy image and is stored in the read image storage section 22.

Figure 8:
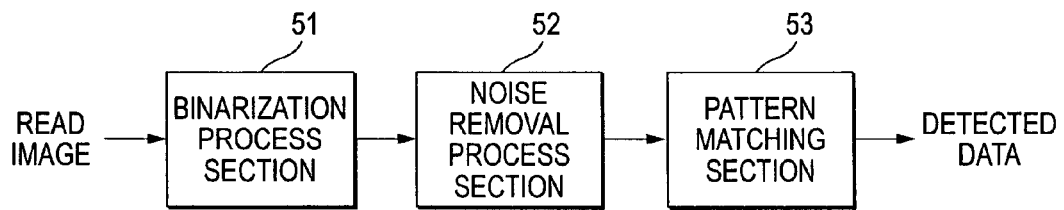
FIG. 8 is a block diagram to show one configuration example of a pattern detection section 23.
Figure 9:
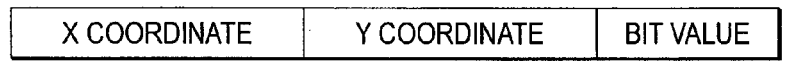
FIG. 9 is a schematic representation of an example of detected data.

The image read by the reading section 11 is also sent to the pattern detection section 23, and a copy prohibition process is performed concurrently with the read image process. At S124, the pattern detection section 23 detects specific patterns as shown in FIGS. 3A and 3B in sequence, and converts the detected patterns into data of "1" and "0." FIG. 8 is a block diagram to show one configuration example of the pattern detection section 23. FIG. 9 is a schematic representation of an example of the detected data. In FIG. 8, numeral 51 denotes a binarization process section, numeral 52 denotes a noise removal process section, and numeral 53 denotes a pattern matching section. The binarization process section 51 binarizes the image output from the reading section 11. Then, the noise removal process section 52 removes noise images (also containing the foreground image) other than the slanting line patterns shown in FIGS. 3A and 3B from the binary image. Then, the pattern matching section 53 performs a collation processing with using the patterns shown in FIGS. 3A and 3B as a template. Accordingly, the slanting line patterns shown in FIGS. 3A and 3B can be detected.

Whenever one pattern is detected, detected data shown in FIG. 9 is generated and is input to the copy prohibition information acquisition section 24 and is also stored in the detected data storage section 25. The detected data includes X and Y coordinates indicating where the pattern is detected and data "1" or "0" corresponding to the detected pattern.

Figure 10:
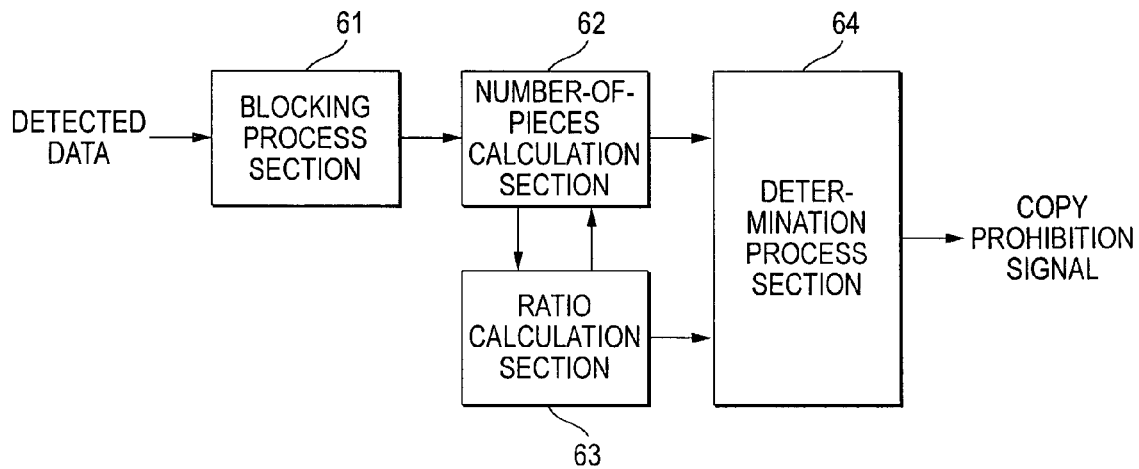
FIG. 10 is a block diagram to show one configuration example of a copy prohibition information acquisition section 24.

Referring again to FIG. 7, at S125, the copy prohibition information acquisition section 24 acquires copy prohibition information from the detected data sent from the pattern detection section 23 if copy prohibition information exists. FIG. 10 is a block diagram to show a configuration example of the copy prohibition information acquisition section 24. In FIG. 10, numeral 61 denotes a blocking process section, numeral 62 denotes a number-of-pieces calculation section, numeral 63 denotes a ratio calculation section, and numeral 64 denotes a determination process section. If the copy prohibition information is a pattern array shown in FIG. 4B or 4C, it is obviously different from the pattern array of the added information shown in FIG. 4A. Thus, even if some patterns cannot be detected, the presence of the copy prohibition information can be recognized so long as the pattern trend in the block is extracted. FIG. 10 shows the configuration for this purpose.

In the configuration of the copy prohibition information acquisition section 24 shown in FIG. 10, the blocking process section 61 reads, from the detected data storage section 25, detected data contained in each detected block in units of detected blocks, which are smaller than the block size of each pattern, preferably equal to or less than a half of the block size. The number-of-pieces calculation section 62 calculates the number of pieces having the value "1" and the number of pieces having the value "0" from the detected data in the read detected block. The ratio calculation section 63 calculates the ratio between the number of pieces having the value "1" and the number of pieces having the value "0" calculated by the number-of-pieces calculation section 62. If the number of pieces of the detected data in the detected block calculated by the number-of-pieces calculation section 62 is in a predetermined range and the ratio of the number of pieces of the detected data having the value "0" or the ratio of the number of pieces of the detected data having the value "1" is equal to or greater than a predetermined threshold value, the determination process section 64 determines that the detected block is in the copy prohibition information block, and counts the number of blocks determined to be in the copy prohibition information block. When the number of the detected blocks becomes equal to or greater than a predetermined threshold value, the determination process section 64 determines that the image is a copy-prohibited image containing the copy prohibition information, and outputs a copy prohibition signal to the control section 30.

At S126 in FIG. 7, the control section 30 determines as to whether or not the copy prohibition information acquisition section 24 has acquired copy prohibition information. In the above-described example, the control section 30 determines as to whether or not a copy prohibition signal is input from the copy prohibition information acquisition section 24. If copy prohibition information is not acquired by the time when the reading section 11 completes to read one-page image, the image forming section 13 is activated at S127, the image stored in the read image storage section 22 is read in synchronization with the operation of the image forming section 13 and is sent to the image forming section 13 for forming an image. At this time, the combining process by the image combining section 29 is not performed.

If it is determined at S126 that copy prohibition information is acquired, namely, if a copy prohibition signal is input from the copy prohibition information acquisition section 24 to the control section 30, the control section 30 reads the detected data from the detected data storage section 25 to acquire the copy prohibition release information at S128. The copy prohibition release information pattern is formed in the end region of a record medial also shown in FIG. 2. Therefore, if the detected data in a fixed region, that is, in the end region is read, the copy prohibition release information can be easily reconstructed. This process will be described later in detail.

At S129, the control section 30 determines as to whether or not the copy prohibition release information has been reconstructed at S128. If the copy prohibition release information cannot be reconstructed, the copy operation is aborted at S132.

If it is determined at S129 that the copy prohibition release information has been reconstructed, the control section 30 determines the copy prohibition release condition indicated by the copy prohibition release information at S130. The control section 30 determines as to whether or not the copy prohibition release condition indicated by the copy prohibition release information is satisfied. The copy prohibition release condition may include various conditions relating to the user ID of the user authenticated at S121, the personal identification number input by the user through the control panel section 31 and the current date and time.

At S131, the control section 30 judges the result of the determination at S130. If it is determined that the copy prohibition release condition is satisfied, the image forming section 13 is activated at S127, the image stored in the read image storage section 22 is read in synchronization with the operation of the image forming section 13 and is sent to the image forming section 13 for forming an image. At this time, the combining process by the image combining section 29 is not performed. If it is not determined at S131 that the copy prohibition release condition is satisfied, the copy operation is aborted at S132.

If an image is formed at S127 or if the copy operation is aborted at S132, history information of the copy operation is recorded at S133 and the copy process is terminated. This history information is similar to the history information at S107 in FIG. 5. If the copy operation is aborted, information indicating that the copy operation is aborted is also contained in the history information. The history information may be stored in the apparatus or may be stored in an external server, etc.

Figure 11:
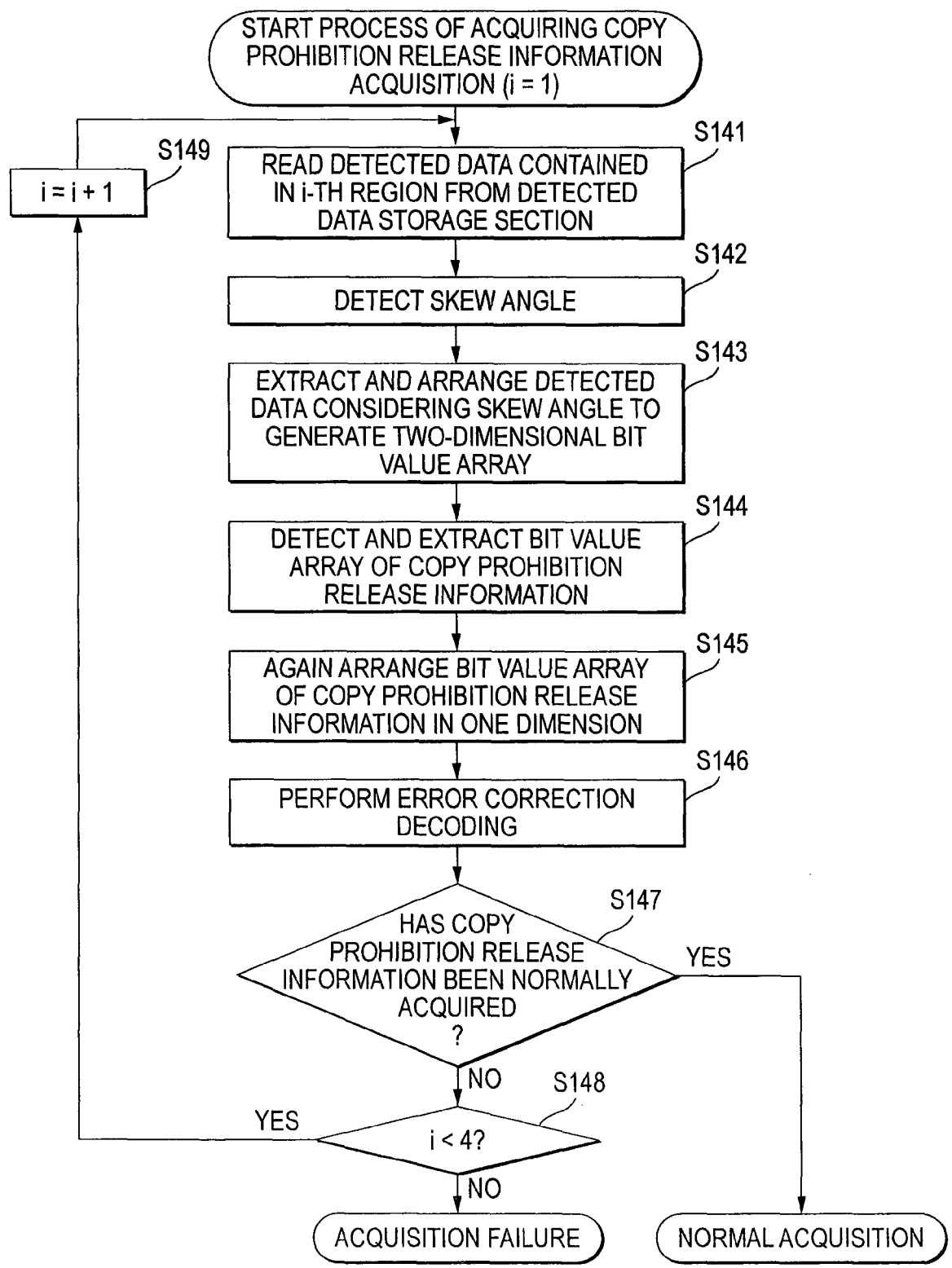
FIG. 11 is a flowchart to show an example of a processing of acquiring copy prohibition release information.
Figure 12:
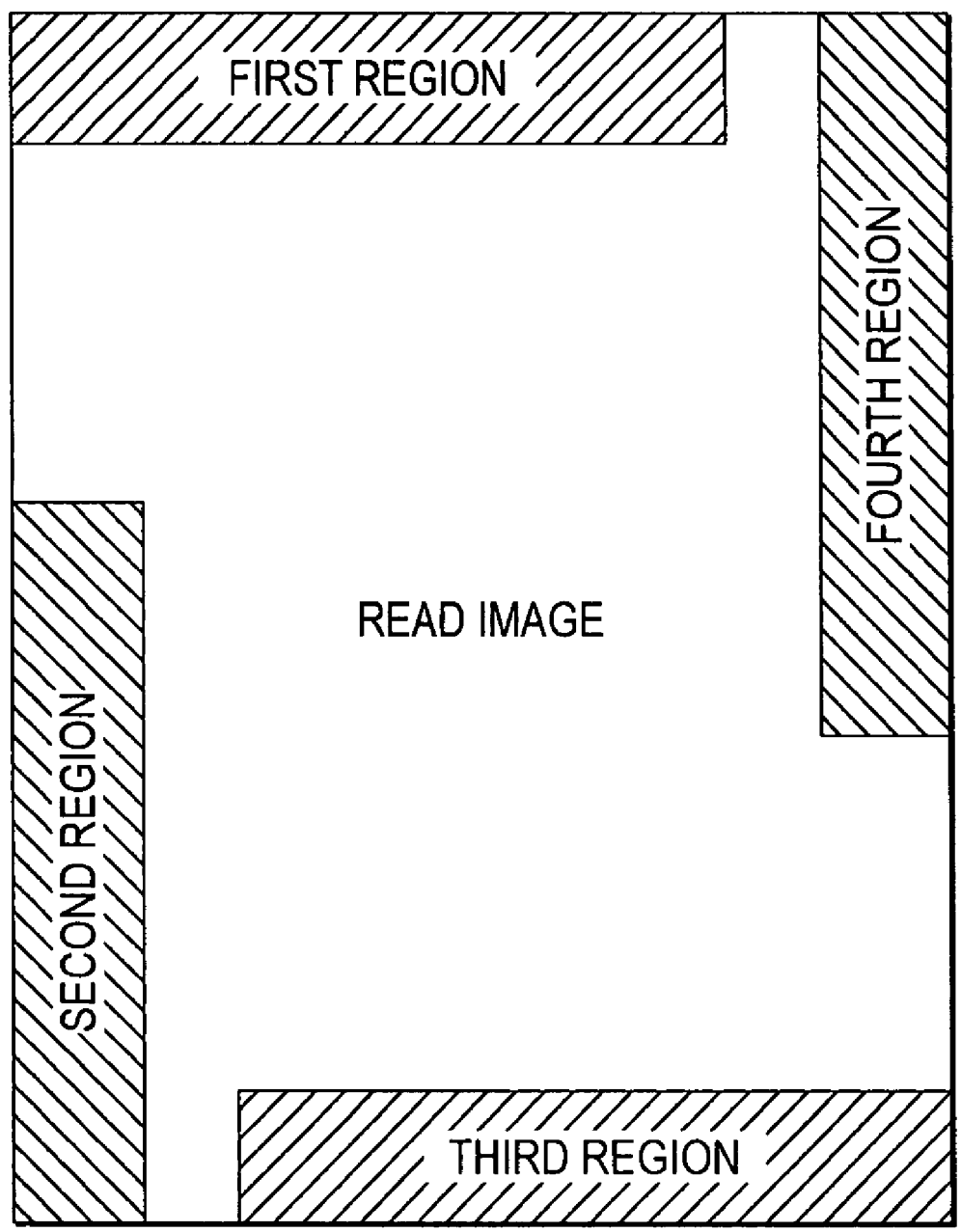
FIG. 12 is a schematic representation of an example of reference regions for performing the processing of acquiring the copy prohibition release information.

FIG. 11 is a flowchart to show an example of the process of acquiring the copy prohibition release information. FIG. 12 is a schematic representation of an example of reference regions used to perform the process of acquiring the copy prohibition release information. FIG. 11 shows an example of the process performed at S128 in FIG. 7. The copy prohibition release information is arranged in each of the end regions existing on the four sides of a recording medium as previously described with reference to FIG. 2. Therefore, the control section 30 sets, in the image read by the reading section 11, a region where a code pattern of the copy prohibition release information arranged in each end region is expected to exist as a reference region used to perform the process of acquiring the copy prohibition release information. Then, the control section 30 acquires the copy prohibition release information from the reference region. In the following description, first to fourth regions shown in FIG. 12 are adopted as the reference regions, and the process of acquiring the copy prohibition release information is performed. It is assumed that the initial value of a variable "i" is equal to 1, and the control section 30 refers to the reference regions from the first region.

At S141, the detected data contained in an i-th region is read from the detected data storage section 25. At S142, a skew angle of the image is found from a position (X, Y coordinates) of the detected data read at S141. As a technique of finding the skew angle, for example, Haff transformation may be used.

At S143, the detected data is arranged in order in the row and column directions considering the skew angle found at S142 to generate values in the detected data as a two-dimensional bit value array.

At S144, the bit value array of the copy prohibition release information is extracted from the two-dimensional bit value array generated at S143. For example, if the copy prohibition release information pattern is arranged as shown in FIG. 4D, the detected data of the synchronous pattern existing at the upper left position is examined, whereby it is determined where the copy prohibition release information is located.

At S145, the bit value array extracted at S144 is again arranged in one dimension. Generally, when the copy prohibition release information is converted into a code pattern and is arranged, an error correction code may be added thereto. In such a case, the original copy prohibition release information is acquired using the error correction code at S146. It is noted that dummy data is eliminated.

At S147, it is determined as to whether or not the copy prohibition release information has been normally acquired.

If the copy prohibition release information has been normally acquired, the copy prohibition release information will be used and it is determined at S129 in FIG. 7 that the copy prohibition release information has been reconstructed.

If it is not determined at S147 that the copy prohibition release information has been normally acquired, it is determined at S148 as to whether or not i<4, that is, whether or not the four reference regions have been processed. If an unprocessed reference region exists, i is incremented by one at S149 and the process returns to S141. Accordingly, the process of acquiring the copy prohibition release information from the next reference region is performed. If the copy prohibition release information has been normally acquired from any reference region, the process terminates normally. If the copy prohibition release information has been normally acquired from none of the reference regions, the acquisition results in failure and it is determined at S129 in FIG. 7 that the copy prohibition release information cannot be reconstructed, and the copy operation is aborted.

The process of acquiring the copy prohibition release information is performed for the specific reference regions shown in FIG. 11 as described above. Thus, this process can be executed at comparatively high speed. Particularly, the end region usually often becomes a blank space. In most cases, if one reference region is processed, the copy prohibition release information would be normally acquired.

Although not described in detail, the trace information is extracted from the internal region and thus extraction process is performed almost for the whole image as a process target. Thus, longer processing time is required as compared with the process of acquiring the copy prohibition release information.

As described above, the copy prohibition information and the copy prohibition release information (and the trace information) are generated as a background image and is combined with the foreground image to form the composite image. Thereby, when reading is executed for copy, it is made possible to prohibit copy unless the condition indicated by the copy prohibition release information is satisfied. However, if one user takes illegal action of cutting out the end region where the copy prohibition release information pattern for allowing the user to copy is arranged and reading it together with another copy-prohibited original by the reading section 11, there is a possibility that a copy can be made.

As one method of preventing such illegal action, for example, the copy prohibition release information is acquired from each of the reference regions shown in FIG. 11 and a match degree among the acquired copy prohibition release information may be determined. Alternatively, majority data among the acquired copy prohibition release information may be adopted. For example, it is considered that the copy prohibition release information is determined based on majority rule or different information is added for making a determination. In this case, however, if portions cut out from another original are used as four end regions, illegal action cannot be prevented.

As another method, it is possible to contain a part of trace information in the copy prohibition release information and determine as to whether or not a part of the trace information is identical with the part of the trace information contained in the copy prohibition release information when the image is read. Since it is difficult to falsify the trace information arranged in the internal region, it is hard to illegally falsify both the information so that both the information are identical, and unauthorized copy as described above can be prevented.

As still another method, ID information may be contained in the copy prohibition information pattern and may also be contained in the copy prohibition release information. When the image is read, a match degree between the IDs obtained from the both may be detected. To detect the ID match degree, different information may be added for making a determination in addition to a complete ID match.

In the description given above, the apparatus has the function of forming an image by the image forming section 13 based on the image data sent via the network 3 and the function of forming an image read through the reading section 11 by the image forming section 13. For example, a background image for copy prohibition can also be combined with a foreground image to form a composite image in a similar manner about image data sent from a computer through another interface instead of receiving the image data through the network 3.

In addition, for example, the apparatus may have a function of transferring an image read through the reading section 11 to the client 2 via the network 3 and a FAX transmission-reception function. To transfer the image read through the reading section 11 through the network 3 and execute FAX transmission, the copy prohibition function can be applied as with the copy described above and if copy is prohibited, transfer to the network 3 and FAX transmission can be canceled. For an image received via FAX, it is also possible to combine a background image for copy prohibition with a foreground image to produce a composite image.

Figure 13:
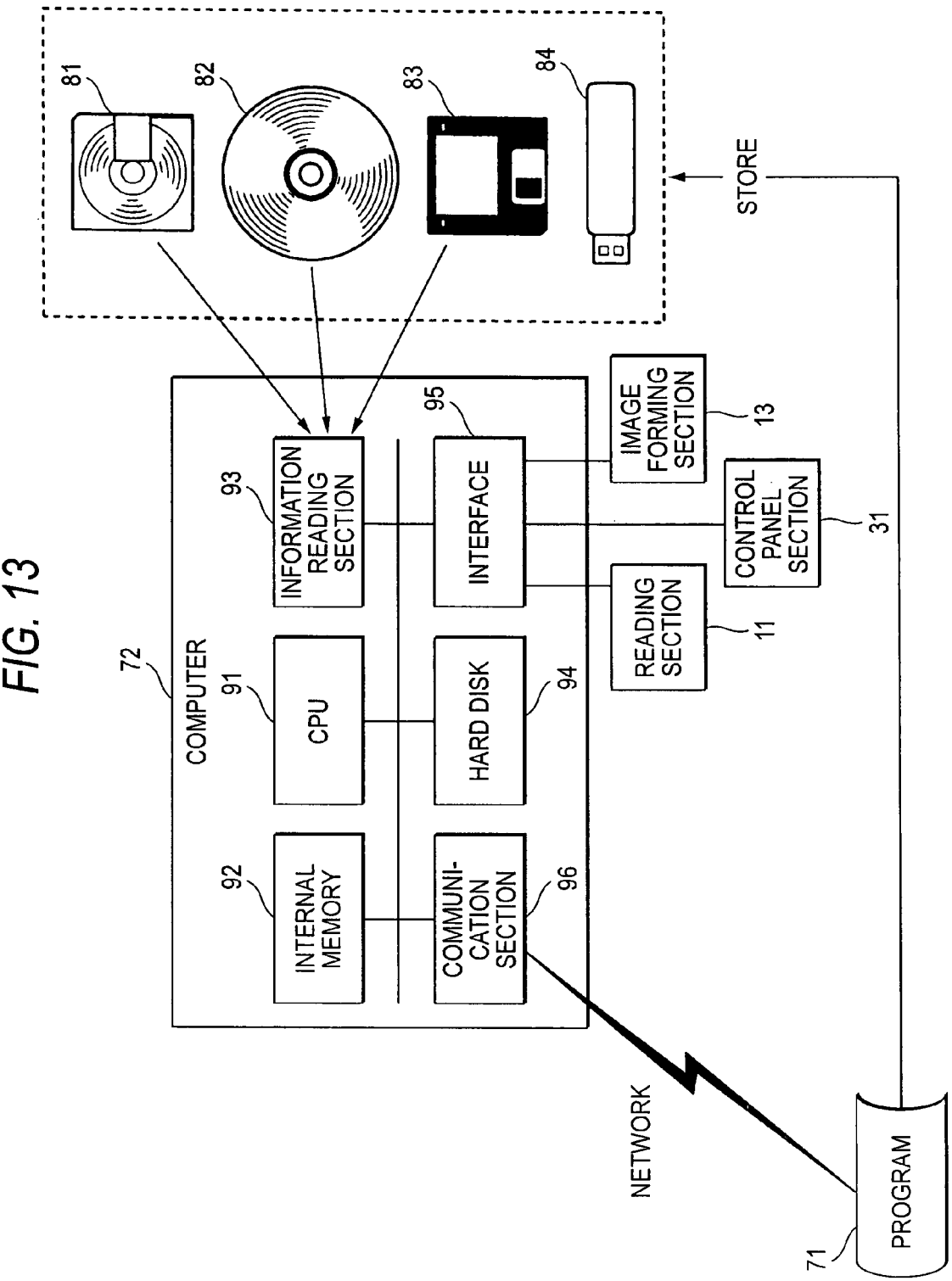
FIG. 13 is a schematic representation of an example of a computer program, a storage medium storing the computer program, and a computer when the function of an image processing section is implemented as the computer program.

FIG. 13 is a schematic representation of an example of a computer program, a storage medium storing the computer program, and a computer when the function of the image processing section is implemented as the computer program. In the figure, numeral 71 denotes a program, numeral 72 denotes a computer, numeral 81 denotes a magneto-optical disk, numeral 82 denotes an optical disk, numeral 83 denotes a magnetic disk, numeral 84 denotes memory, numeral 91 denotes a CPU, numeral 92 denotes internal memory, numeral 93 denotes an information reading section, numeral 94 denotes a hard disk, numeral 95 denotes an interface, and numeral 96 denotes a communication section.

Some or all of the functions of the control section 30 or further the functions of the read image processing section 21, the pattern detection section 23, the copy prohibition information acquisition section 24, and the image combining section 29 in the image processing section 12 described above in the exemplary embodiment can be implemented as the program 71 that can be executed by a computer. In this case, the program 71, the data used by the program, and the like can also be stored in a computer-readable storage medium. Of course, some functions can also be implemented as hardware or all may be implemented as hardware. For example, all or some of the read image processing section 21, the pattern detection section 23, the copy prohibition information acquisition section 24, and the image combining section 29 and some of the functions of the control section 30 can also be implemented as dedicated hardware.

The storage medium for storing the program 71 is a medium that can cause a change state of energy of magnetism, light, electricity, etc., to occur in the information reading section 93 included in the hardware resources of the computer in response to the description of the program and can transfer the description of the program to the reader in the format of the signal corresponding to the change state. For example, the storage medium is the magneto-optical disk 81, the optical disk 82 (containing a CD, a DVD, etc.,), the magnetic disk 83, the memory 84 (containing an IC card, a memory card, etc.,), etc. Of course, the storage media are not limited to portable media.

The program 71 is stored in any of the storage media and the storage medium is placed in the information reading section 93 or the interface 95 of the computer 72, for example, whereby the program 71 is read from the computer 72 and is stored in the internal memory 92 or on the hard disk 94 and is executed by the CPU 91, whereby some or all of the functions of the control section 30 or further the functions of the read image processing section 21, the pattern detection section 23, the copy prohibition information acquisition section 24, and the image combining section 29 in the image processing section 12 can be implemented. Alternatively, they may be implemented by transferring the program 71 to the computer 72 through a network, etc., receiving the program 71 at the communication section 96 of the computer 72, storing the program 71 in the internal memory 92 or on the hard disk 94, and executing the program 71 by the CPU 91, or they may be implemented by internally installing memory such as ROM into which the program 71 is previously written.

The reading section 11, the image forming section 13, and the control panel section 31 are connected through the corresponding interface 95. In addition, various units can be connected to the computer 72 through the interface 95. The read image storage section 22, the detected data storage section 25, the foreground image storage section 27, the background image storage section 28, etc., can be implemented using the hard disk 94, the internal memory 92, etc. Further, the network interface section 26 corresponds to the communication section 96.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be indicated by the following claims and their equivalents.

What is claimed is:

1. An image processing apparatus comprising:
    a background image generation section that generates a background image, which represents, by predetermined patterns, (i) background information containing copy prohibition information indicating copy is prohibited and (ii) copy prohibition release information indicating a condition to release copy prohibition;
    a combining section that combines a target image, and the background image generated by the background image generation section to generate a composite image and that outputs the composite image to a formation section that forms an image on a sheet of paper; and
    a control section that controls the formation section to form the composite image on the sheet of paper so as to arrange a pattern of the predetermined patterns of the copy prohibition release information in an edge portion of the sheet of paper and so as to arrange a pattern of the predetermined patterns of the copy prohibition information only in an internal region of the sheet of paper, wherein the edge portion is an area of the sheet of paper other than an area including the predetermined patterns of the copy prohibition information and is located between the internal region and a periphery of the sheet of paper.

2. The apparatus according to claim 1, wherein the control section arranges a plurality of patterns of the predetermined patterns of the copy prohibition release information in the edge portion of the sheet of paper.

3. The apparatus according to claim 1, wherein the control section arranges a pattern of dummy data in the edge portion of the sheet of paper together with the pattern of the predetermined patterns of the copy prohibition release information arranged in the edge portion.

4. The apparatus according to claim 1, wherein a part of a pattern of the predetermined patterns of the background information is arranged in the edge portion where the pattern of the predetermined patterns of the copy prohibition release information is arranged.

5. The apparatus according to claim 1, wherein the copy prohibition release information contains information associated with the copy prohibition information.

6. An image forming apparatus comprising:
the image processing apparatus according to claim 1; and
a formation section that forms an image output from the image processing apparatus on the sheet of paper.

7. A non-transitory computer readable medium storing a program causing a computer to execute image processing, the image processing comprising:
generating a background image, which represents, by predetermined patterns, (i) background information containing copy prohibition information indicating copying is prohibited and (ii) copy prohibition release information indicating a condition to release copy prohibition;
combining a target image and the generated background image to generate a composite image;
controlling the formation section to form the composite image on a sheet of paper so as to arrange a pattern of the predetermined patterns of the copy prohibition release information in an edge portion of the sheet of paper and so as to arrange a pattern of the predetermined patterns of the copy prohibition information only in an internal region of the sheet of paper, wherein the edge portion is an area of the sheet of paper other than an area including the predetermined patterns of the copy prohibition information and is located between the internal region and a periphery of the sheet of paper; and
outputting the composite image to a formation section that forms an image on the sheet of paper.

\* \* \* \* \*

UNITED STATES PATENT AND TRADEMARK OFFICE
CERTIFICATE OF CORRECTION

PATENT NO.       : 8,023,127 B2
APPLICATION NO.  : 11/798426
DATED            : September 20, 2011
INVENTOR(S)      : Junichi Matsunoshita It is certified that error appears in the above-identified patent and that said Letters Patent is hereby corrected as shown below:

On the cover page, item 73 should be corrected to read as follows:

(73) Assignee: Fuji Xerox Co., Ltd., Tokyo (JP)

Signed and Sealed this
Twenty-fifth Day of September, 2012

David J. Kappos
*Director of the United States Patent and Trademark Office*